Plate I.

2 Shts. 1

LYMAN F. MUNGER.

Improvement in Permutation Locks.

No. 4,596.

Reissued Oct. 17, 1871.

Witnesses.
Harry M. Phillips,
P. H. Sweet Jr.

Inventor:
Lyman F. Munger,
for Burke Fraser & Osgood,
attys - Rochester, N.Y.

THE NORRIS PETERS CO., WASHINGTON, D. C.

Plate II. 2 Sheets.

LYMAN F. MUNGER.

Improvement in Permutation Locks.

No. 4,596. Reissued Oct. 17, 1871.

Witnesses
Harry H. Phillips,
P. H. Swift, Jr.

Inventor.
Lyman F. Munger,
by Burke, Fraser & Osgood,
attys Rochester, N.Y.

THE NORRIS PETERS CO., WASHINGTON, D. C.

UNITED STATES PATENT OFFICE.

LYMAN F. MUNGER, OF ROCHESTER, NEW YORK.

IMPROVEMENT IN PERMUTATION LOCKS.

Specification forming part of Letters Patent No. 17,804, dated July 14, 1857; reissue No. 62, dated April 2, 1861; extended seven years; reissue No. 4,596, dated October 17, 1871.

*To all whom it may concern:*

Be it known that I, LYMAN F. MUNGER, of the city of Rochester, in the county of Monroe and State of New York, have invented certain Improvements in Locks, of which the following is a specification:

This invention consists in certain improvements for effecting those changes in a permutation lock, which changes are necessary either to allow or prevent the bolt being operated or thrown, and these means will be fully understood by those skilled in the art from the following description of the several parts and their mode of action.

Figure 1:
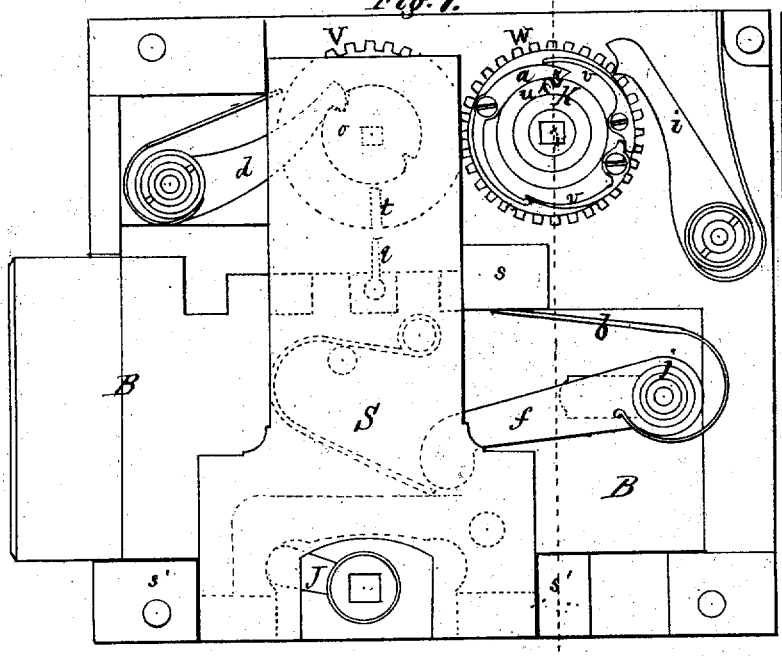
Figure 2:
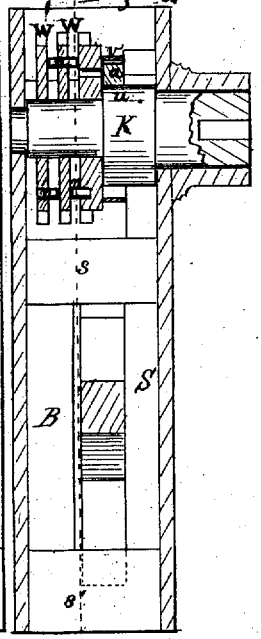
Figure 3:
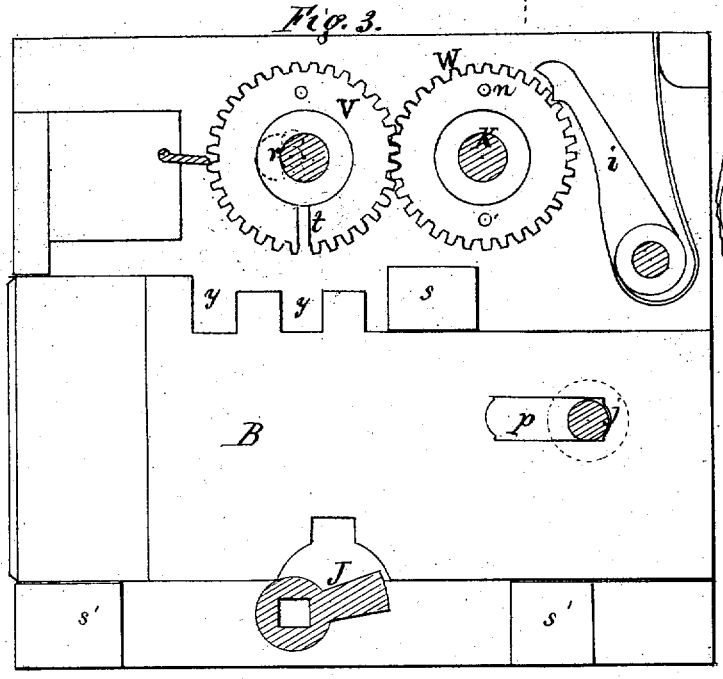
Figure 4:
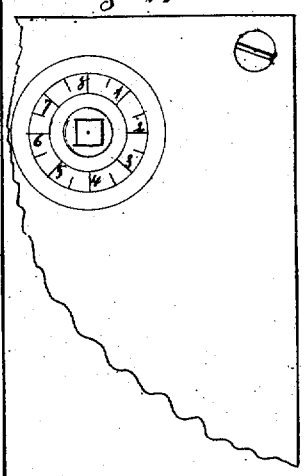
Figure 5:
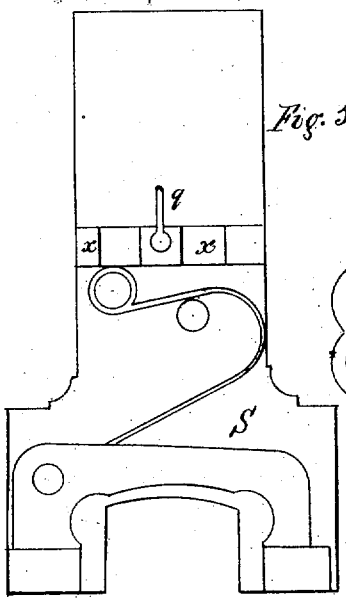
Figure 7:
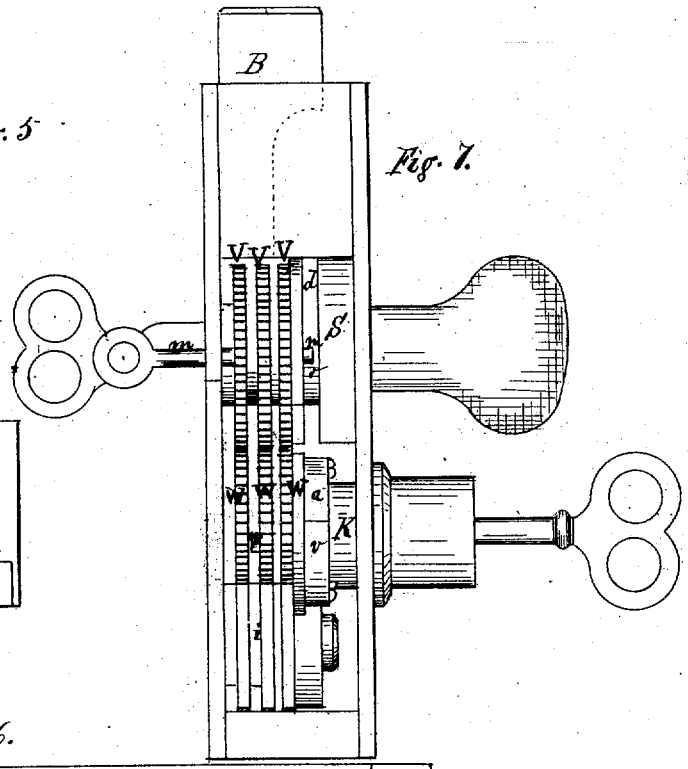
Figure 6:
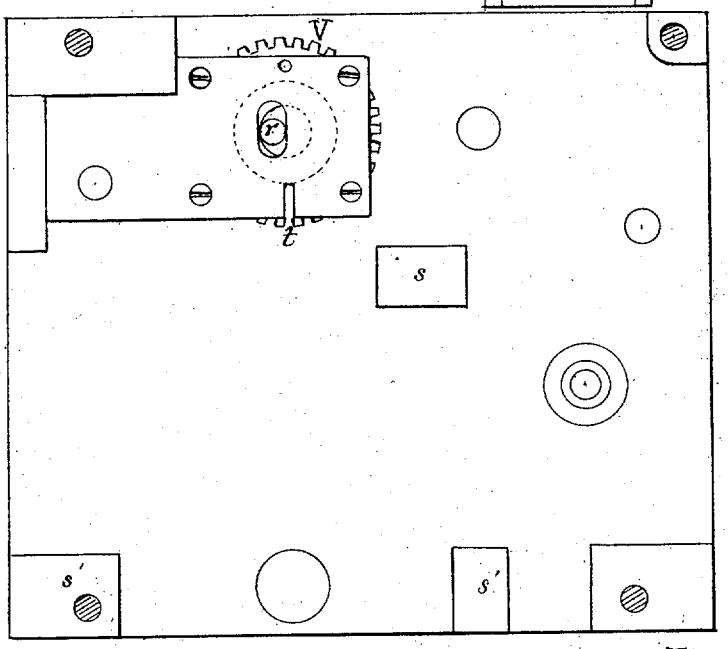
Figure 8:
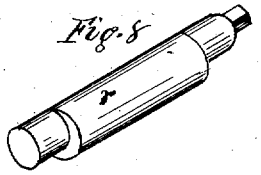

In the drawing, Figure 1 is an elevation, showing the interior of the lock; Fig. 2, a vertical cross-section of the same in the plane of the dotted, Fig. 1; Fig. 3, a vertical longitudinal section in the plane of the dotted line, Fig. 2; Fig. 4, a fragment of the outside of the lock in elevation, showing the index-scale; Fig. 5, an elevation of the tumbler removed from place; Fig. 6, an elevation of the lock-case with all the working parts removed except one set of wheels; Fig. 7, a top view of the lock; Fig. 8, a view of the eccentric for disengaging the wheels.

On reference to the drawing there will be seen B, the bolt of the lock; J, the bit of the stationary key which throws said bolt back and forth; and S, Fig. 5, the tumbler which secures the bolt and prevents its movements by means of the projections *x x*, which interlock with corresponding indentations or sockets *y y* in the bolt. This tumbler is guided vertically by the studs *s s′ s′*, and is constantly forced down by a spring, *b*, acting through the medium of a lever, *f*. This lever turns on a pin, *j*, at its center of motion, which passes through a slot, *p*, of the bolt, as seen in Fig. 3. The action of the key is such as to raise the tumbler, if nothing prevents, before acting upon the bolt, thus leaving the bolt free to move back and forth. The tumbler S has affixed to it a tongue, *q*, which strikes into the slots *t* of wheels V, of which there are three in the set, as shown in the drawing. If the slots in these wheels should all coincide and come vertically over the tongue *q* it is evident that the tumbler might be raised by the action of the bit J of the key; but if the slots should not all coincide with the line of *q*, then the tumbler could not be raised, and consequently the bolt could not be thrown. Thus far the lock is similar to others of its class. Working into each of the wheels V are others which constitute the set W, and these two sets of wheels may be engaged with and disengaged from each other by means of the eccentric arbor *r* on which the wheels V are located. The eccentricity of this arbor is simply such that when thrown in one direction the two sets of wheels will be engaged, and when thrown in the other direction they will be disengaged. This arbor has a square end, by which it may be turned by a key fitting thereon; and when turned in one direction the whole is held in position by means of a pawl, *d*, catching into notches in the disk *o*, which is secured to the arbor. These notches are so arranged that they allow the pawl to spring out when turned in the other direction. The journals or bearing ends of the arbor rest in vertical slots, and the eccentric portion in horizontal slots, so as to bring the wheels square together when the engagement is made. Two of the wheels W are fitted loosely upon the arbor K, but are prevented from moving freely or accidentally by means of the pawls *i*, an angular bearing or projection of which drops into the tooth spaces of said wheels. It allows them to revolve in either direction when sufficient force is applied. The remaining wheel, W, has pivoted upon its face a friction-clutch, *a*, with a double angular point, *z*, Fig. 1, which bears upon the circular face *u* of arbor K, and by its friction thereon serves to give sufficient adhesive connection between said arbor and wheel to drive the latter, and consequently all the wheels W, unless undue resistance is met, when the clutch slips upon the arbor, and the latter revolves free. By this means breakage and disarrangement are avoided. A spring or springs, *v*, may be employed to give the desired elasticity to the clutch. This feature of a friction-clutch combined with the arbor is such that the lock-works may be driven by the frictional connection; but if any undue resistance is met the said arbor or spindle may turn free.

In order to restore the position of the wheel W on its arbor K in case of slipping, as above described, I form in the face of the arbor an angular notch, *k*, into which the point *z* of the clutch strikes. When these parts coincide the wheels will always be in position to be set to open the lock. Were it not for this arrangement of the notch and point, or some equivalent, there would be no means of telling the position of the wheels when the door upon which the lock was placed was closed. This feature also constitutes one novelty in my invention. Each of the wheels W has a pin or projection, *n*, projecting from its side, so placed at equal distances from the center as to strike together when the wheels are turned. This one wheel gives motion to another, and each has a full revolution, lacking the thickness of a pin, before striking the next.

It will be noticed particularly that the pins *n n* are connected with one set of wheels, W, and the slots *t* are formed in the other set of wheels V, and that as these two sets of wheels are disengaged and then engaged in different positions, these pins and slots will be correspondingly changed in their positions relatively with each other. This is of importance, as thereby the different changes or combinations are effected, accordingly as set on the index-scale outside the lock.

The "combination" of the lock is changed as follows: First, having the slots *t* all in position over tongue *q*, the wheels V are disengaged from the wheels W, as before described; turn the arbor K around till by means of the pins *n* on the several wheels W, all these wheels are caused to revolve; then bring the index or pointer on this arbor opposite any number on the graduated ring within which it moves and note its position; then reverse the motion of the arbor K, carrying it around one complete revolution, and as much more as may be desired, and note the figure opposite which the pointer on the arbor stands, not completing two revolutions, however. Again reverse the motion of the arbor; beware, however, that it be not carried a full revolution, and again note the position of the pointer, as before. If now the wheels V be re-engaged with the wheels W the lock can be opened by turning the wheels in proper position, according to the prearranged formula—that is, according to the numbers to which they have been set.

This arrangement of two sets of wheels or equivalents, one carrying driving-pins and the other the slots, insures a very great number of changes of the combination—a change being effected at each distinct position to which said pins and slots are set relatively with each other.

So far as I am aware, I am the first to so combine two sets of wheels, one having the pins and the other the slots, that their relative position may be changed. The pins and slots had been combined in a single set, and both on a single wheel before my invention; but in such case the relative position of said parts could not be changed unless by removing the pins by hand and affixing them in different positions, as in Aiken's lock, and others. In my case, the positions of the pins and slots can be changed without opening the lock, being effected by simply disengaging the wheels to make the change, and then re-engaging them, as before described, and turning them to place.

When the slots *t* are all in line over tongue *q*, a hole may be bored through the back of the lock, and through the wheels, and a pin, *m*, may be inserted therein at any time to take up the combination if it is lost. In such case, as the wheels are turned, the pin passes through gradually till all are in line.

What I claim, and desire to secure by Letters Patent, is—

1. A series of wheels, W, revolving on a common center, and provided with teeth or indentations at their peripheries for changing their position relatively with other wheels V or their equivalents, when each of the wheels W aforesaid has a pin projecting from its side or sides, so placed as to interlock with similar pins in the wheel or wheels next adjoining it, to operate substantially as and for the purpose herein set forth.

2. In a "combination" lock, the combination of two sets of wheels or their equivalents, capable of engagement and disengagement, when one set has interlocking-pins *n n* for driving the wheels of that set, and the other set has slots *t t* for releasing the bolt, the relative position of said pins and slots being changed to produce new "combinations," by simply disengaging and changing the relative positions of the wheels, and re-engaging them, as specified.

3. In combination with the two sets of wheels W and V, which are capable of engagement and disengagement, the eccentric arbor *r*, passing through the wheels V, for throwing one set away from and toward the other, as herein described.

4. In combination with the wheels V and eccentric arbor *r*, the notched disk *o* and pawl *d*, for holding the wheels in or out of engagement, as described.

5. In combination with the arbor or spindle of a combination lock, a friction-clutch, *a*, so arranged that the lock-works may be driven by the frictional connection, but if any undue resistance is met the said arbor or spindle may turn free, as described.

6. The combination, with the clutch *a* and arbor K, of the notch *k* and point *z*, for the purpose of restoring the position of the wheel W on its arbor, as described.

In witness whereof I have hereunto set my hand this 20th day of September, 1871.

L. F. MUNGER.

Witnesses:
R. F. OSGOOD,
JAS. SARGENT.

(93)